Feb. 13, 1962 H. BROWNING 3,020,875
SHOCK OVERLOAD INDICATOR
Filed Dec. 1, 1959

INVENTOR.
HARRISON BROWNING.
BY Max E. Shirk
ATTORNEY.

United States Patent Office 3,020,875
Patented Feb. 13, 1962

3,020,875
SHOCK OVERLOAD INDICATOR
Harrison Browning, Catalina Foothills Estates,
Tucson, Ariz.
Filed Dec. 1, 1959, Ser. No. 856,600
4 Claims. (Cl. 116—114)

This invention relates to a shock overload indicating device. More particularly it is concerned with devices of this type for attachment to an article or object to be transported to indicate whether the article had been subjected to mechanical shocks sufficient to damage its internal parts while in transit.

I provide a shock overload indicating device or gauge of the type described which will trip when subjected to shocks in any direction in a plane perpendicular to a horizontal axis and in two directions in a plane perpendicular to a vertical axis. I also provide a gauge in which a weight is employed that is not impeded by frictional forces and which does not depend on the elongation of a spring.

It is an object of the invention to provide a shock overload indicator which indicates shock in different directions.

Another object of the invention is to provide an overload shock indicating device capable of responding to shocks of short duration.

A further object of the invention is to provide a simple, sensitive and inexpensive shock indicating device constructed of readily available materials and easily attachable to an object or article to be transported, which device indicates at a glance whether the article to which it is attached has been subjected to any undesirable shocks, or shocks beyond a certain magnitude, and also the probable direction thereof.

A still further object of the invention is to provide a gauge of the type described wherein the action of the gauge is not impeded by frictional forces.

Another object of the invention is to provide such a gauge which, after the instant of tripping, is not subjected to further biasing of a spring.

Another object of the invention is to provide a device of the type described which employs a shaped weight wherein the shape of the weight cooperates with shaped stop means to prevent the device from being tripped in the wrong direction.

These and other objects will be more readily understood by reference to the following detailed description and drawings wherein.

Figure 1:
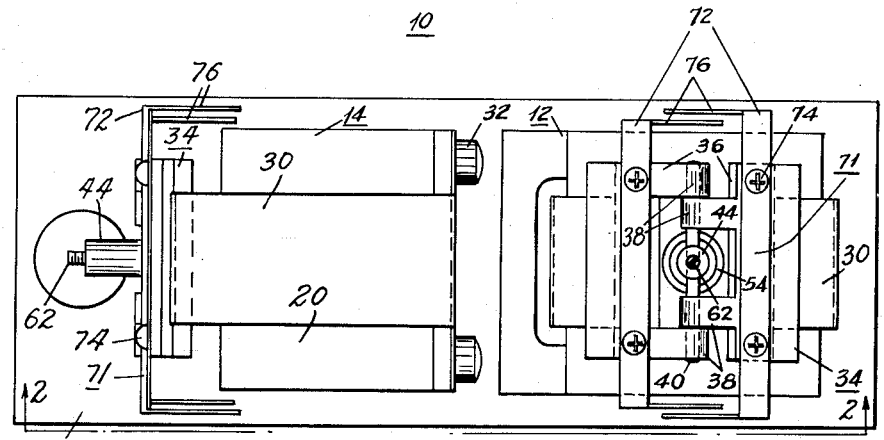
FIGURE 1 is a plan view of a device of the invention with its cover removed.

The shock overload indicator comprises generally a first gauge mounted on a base with its longitudinal axis lying in a vertical plane and a second gauge mounted on the same base with its longitudinal axis in a horizontal plane. These gauges employ weights suspended from a rod which is slidably mounted on the pin of a release mechanism. The release mechanism is spring biased in one position and is suddenly tripped and relieved of further spring pressure the instant a shock overcomes the bias of the spring.

Referring to the drawings, a shock overload indicator 10 comprises first and second shock sensitive units 12 and 14, respectively, which are mounted at right angles to each other on a common base 16. A cover 18 may be provided to protect the units 12 and 14 from the elements.

The shock sensitive unit 14 includes a housing 20 which may be made of any suitable material and may take any suitable shape such as square or cylindrical. The housing 20 may have a bottom wall 21, a cover 22 and an encompassing sidewall 23. The cover 22 may be integral with the sidewall and includes an annular port 24.

A flat spring 30 is affixed to the housing 20 by screws 32 as shown. The ends of the spring 30 terminate in spaced relation above the port 24. A tripping mechanism 34, resembling a butt hinge, includes plate members 36 having ears 38 pivotally mounted on a hinge-pin 40. A substantially V-shaped groove 42 may be machined along the outer edges of the plates 36 to receive the ends of spring 30.

A rod 44 includes an upper slot 46 and a lower slot 48. An upstanding protuberance 50 is mounted within the lower slot 48. The rod 44 is pivotally and slidably mounted on the hinge-pin 40 intermediate the ears 38 with sufficient clearance to permit canting of the rod 44 on, and pivoting about, the longitudinal axis of the hinge-pin 40.

Figure 2:
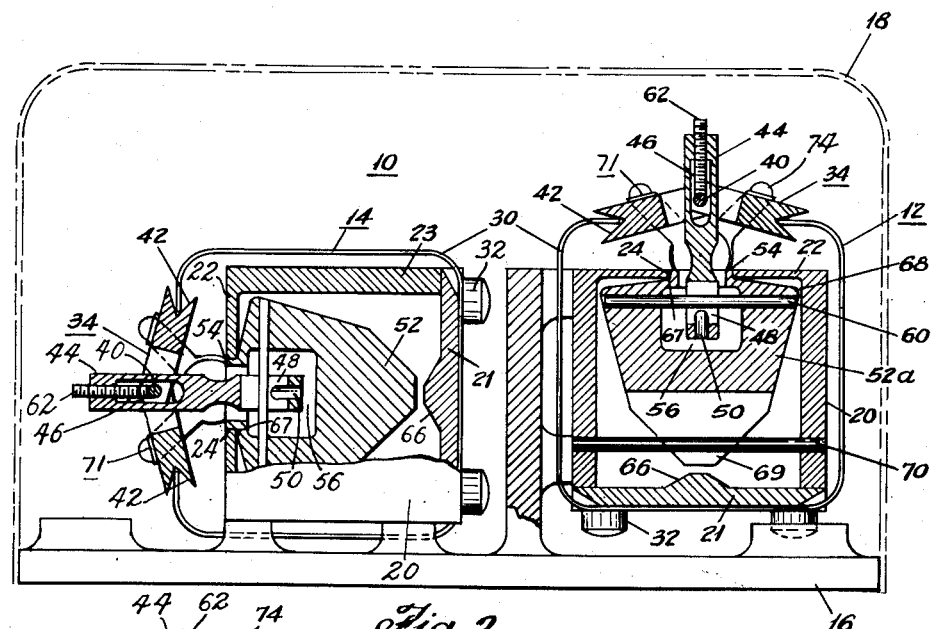
FIGURE 2 is an elevational view, partly in section taken along the line 2—2 of FIGURE 1, of the device of FIGURE 1 with its cover shown in phantom.

A weight 52 may be shaped substantially as shown. It has an annular shoulder 54 and a chamber 56 at its upper end. A shaft 60 suspends the weight 52 from the protuberance 50 in such a manner that the lower end of the rod 44 has limited movement along the shaft 60 within the chamber 56 and so that the shoulder 54 is disposed within the port 24 when the tripping mechanism 34 is biased by the spring 30 as shown in FIGURE 2. A screw 62 threadedly engages the upper end of rod 44 to adjust the tension of spring 30 by adding more, or less, as the case may be, pressure to the shaft 60.

An upstanding stop 66 is shaped somewhat like a frustum of a cone or pyramid and is an integral part of the bottom wall 21 immediately subjecent the weight 52. The stop 66 prevents the weight 52 from moving toward the bottom of housing 20 along the longitudinal axis of the weight 52 due to shocks in a horizontal direction, in the case of unit 14, and in a vertical direction, in the case of unit 12, but does not interfere with canting of the weight 52 first about a pivot point 67 between shoulder 54 and port 24 and then about a pivot point 68 between the upper peripheral edge of weight 52 an dthe corner formed by sidewall 23 and cover 22.

The unit 12 is identical to the unit 14 with the exception that the weight 52a of unit 12 includes a bifurcated slot 69 and the housing 20 of the unit 12 has a shaft 70 disposed across the bottom portion thereof within the bifurcated slot 69. This permits the weight 52a to swing on protuberance 50, in the manner of a pendulum, longitudinally of the shaft 70, but prevents the weight 52a from swinging transversely of the shaft 70.

Figure 3:
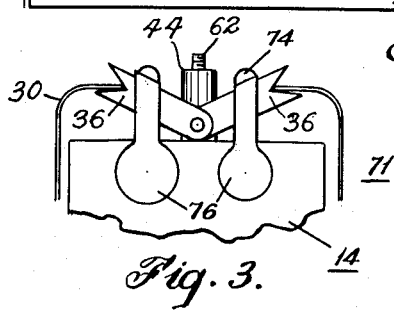
FIGURE 3 is an elevational view of a portion of the device of FIGURE 1 showing one shock indicating gauge in its tripped position.

An assembly 71 is used to indicate to an observer whether or not the shock indicator has been tripped. The assembly 71 includes a strap 72 mounted across the top of each plate 36 of the tripping mechanism 34 by any suitable means, such as screws 74. A disk 76 is carried by each strap 72 in such a manner that the disk carried by one strap 72 will overlap and hide from view the disk 76 carried by the other strap 72 when the tripping mechanism 34 is biased as shown in FIGURE 2 and will be separated so that both disks 76 will be in view when the mechanism 34 is in its tripped position, as shown in FIGURE 3.

Operation of the device will be readily understood. The screw 62 may be adjusted to subject the tripping mechanism 34 to a suitable biasing from spring 30. For example, the screw 62 may be tightened against hinge-pin 40 more and more as the g force that can be withstood by a container to which the shock indicator assembly 10 may be attached becomes greater and greater.

The shock sensitive unit 12 trips only when subjected to shocks in a substantially horizontal plane. A shock in a horizontal plane substantially parallel with shaft 70 causes the weight 52a to swing on protuberance 50. This, in turn, causes weight 52a to pivot about pivot points 67 and 68. Should the inertia imparted to the weight 52a by this swing be greater than the biasing force of the spring 30 and should the swing be great enough so that the bottom of weight 52a will clear the stop 66, the tripping mechanism 34 will snap downwardly releasing weight 52a. The disks 76 will then be in the position shown in FIGURE 3 to indicate that the container to which the shock overload indicator 10 may be attached has been subjected to an excessive shock.

A shock in any direction perpendicular to the longitudinal axis of weight 52 of unit 14 causes the weight to swing as just described in connection with unit 12 with the consequences there stated.

It has been shown that I have invented a new and useful shock overload indicator. While one embodiment of the invention has been shown and described for purposes of illustration, it is to be understood that I do not wish to be limited thereby.

I claim:

1. In a shock sensitive unit including a housing having a bottom wall, an encompassing sidewall and a cover, a port in said cover, and a flat spring encompassing said housing, the ends of said spring terminating in spaced relation superjacent said port, the improvement comprising, hinged means including a hinge pin supported by said ends of said spring and being biased thereby, shaped, upstanding stop means on said bottom wall, a weight swingably supported by said hinge pin within said housing superjacent said stop means, said weight having an annular shoulder normally disposed within said port in such a manner that said weight will cant about a pivot between said shoulder and the peripheral edge of said port, the lower portion of said weight corresponding in shape to said stop means.

2. In a shock overload indicator including first and second shock sensitive units mounted on a common base at right angles to each other, the longitudinal axis of said first unit lying in a vertical plane, each of said units including a housing having a bottom wall, an encompassing sidewall and a cover, a port in said cover, shaped, upstanding stop means on each bottom wall, and a flat spring encompassing said housings, the ends of each spring terminating in spaced relation superjacent said ports, the improvement comprising hinged means supported by the ends of each spring, each hinged means being biased by said spring and including a hinge-pin, a rod slidably and pivotally mounted on each hinge-pin, said rods depending into said housings through said ports, a slot in each rod near its lower end, an upstanding protuberance mounted in each slot, a shaped weight swingably mounted on each protuberance, the shape of said weight cooperating with said shaped stop means to prevent movement of said weight toward the bottom of said housing, an annular shoulder on said weight, said shoulder being normally disposed within said port, a bifurcated slot at the lower end of said weight in said first shock sensitive unit and a shaft mounted in said housing within said slot to prevent said weight from swinging transversely of hinge pin.

3. The shock sensitive unit of claim 1 characterized in that the top of said weight slopes downwardly from said annular shoulder to a peripheral edge of said weight.

4. The shock sensitive unit of claim 1 including also a bifurcated slot at the lower end of said weight, and a shaft mounted in said housing within said slot to prevent said weight from swinging transversely of said hinge-pin.

References Cited in the file of this patent

UNITED STATES PATENTS 2,671,832     Hansard _____ Mar. 9, 1954